July 10, 1928.  1,677,017
C. H. BOARDMAN
VEHICLE FOR CHILDREN
Filed May 31, 1927  2 Sheets-Sheet 1

C. H. Boardman INVENTOR
BY ATTORNEY

July 10, 1928.  C. H. BOARDMAN  1,677,017
VEHICLE FOR CHILDREN
Filed May 31, 1927    2 Sheets-Sheet 2
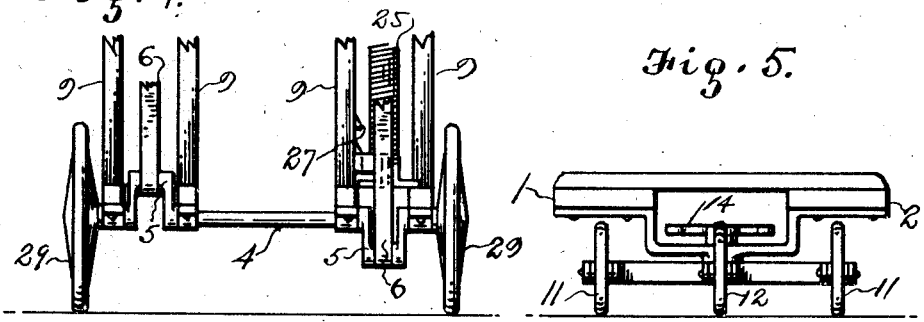
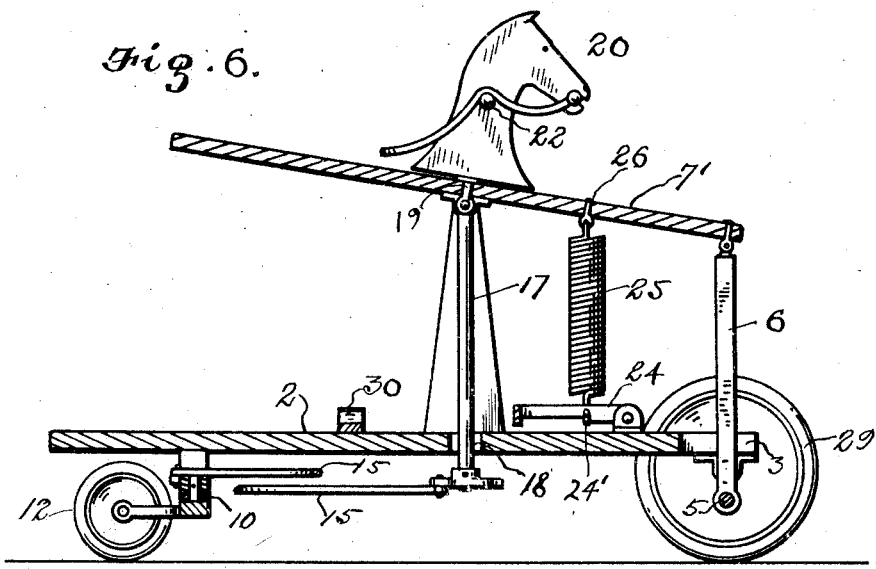
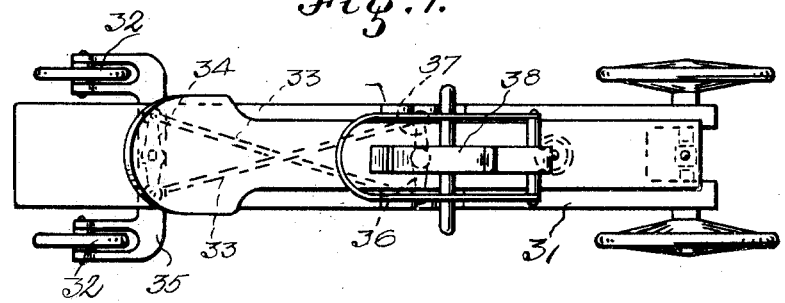
C. H. Boardman INVENTOR
BY
ATTORNEY Patented July 10, 1928.

1,677,017

UNITED STATES PATENT OFFICE.

CHARLES H. BOARDMAN, OF COLUMBUS, OHIO.

VEHICLE FOR CHILDREN.

Application filed May 31, 1927. Serial No. 195,303.

The present invention is directed to improvements in toy vehicles for children.

The primary object of the invention is to provide a device of this character so constructed that it can be easily propelled and guided while being propelled, the construction being such that the occupants can upon moving upwardly and downwardly upon the seats of the vehicle rotate the driving axle.

Another object of the invention is to provide a device of this kind so constructed that either of the seats can be used as means for propelling the vehicle.

Another object of the invention is to provide means in the nature of a spring to prevent a dead center and consequent stalling of the vehicle when the same is occupied by one child.

In the accompanying drawings:—

Figure 4 is a fragmentary rear elevation.

Figure 5 is a rear elevation.

Figure 6 is a longitudinal sectional view.

Figure 7 is a top plan view of a modified form of the invention.

Figure 1:
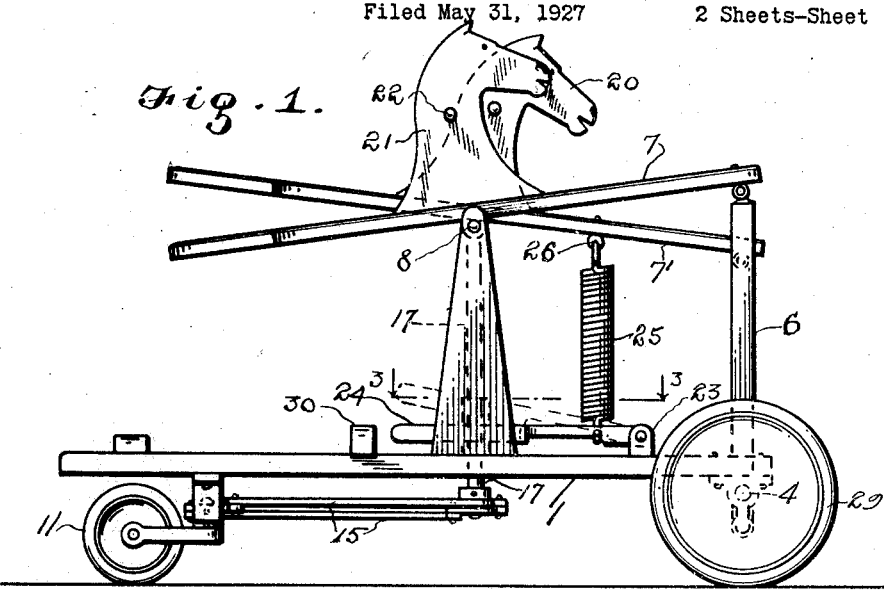
Figure 1 is a side elevation of the device.
Figure 2:
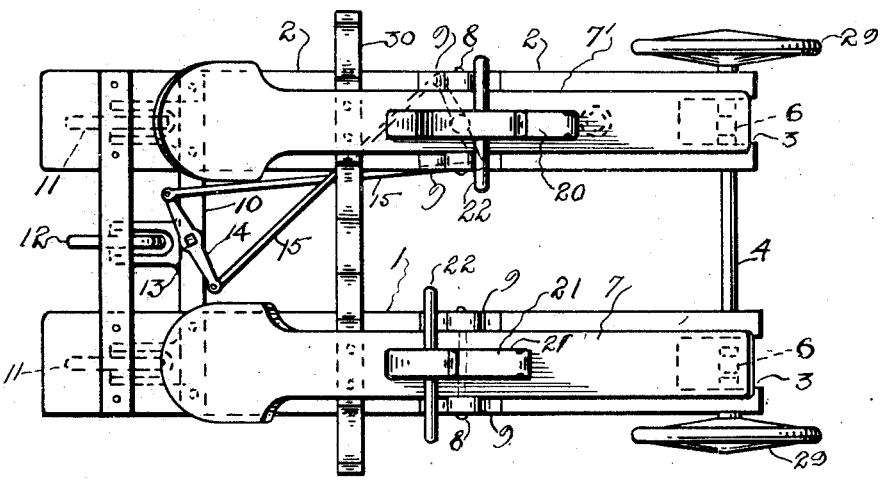
Figure 2 is a top plan view.
Figure 3:
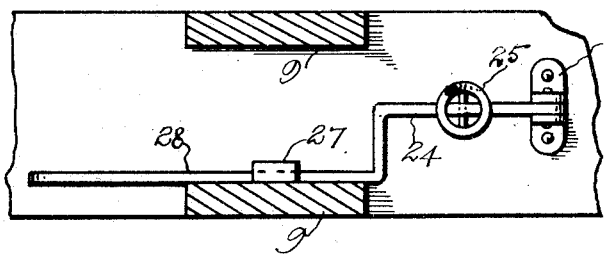
Figure 3 is a sectional view on line 3—3 of Figure 1.

Referring to the drawings, 1 and 2 designate platforms, the forward ends of which being provided with slots 3—3, the purpose of which will be later explained. To the forward ends of the platforms is secured a drive axle 4 having crank arms 5 formed therein and to which are pivotally connected the lower ends of pitmen 6, which have their upper ends pivotally connected to the forward ends of the seats 7 and 7′, which are pivotally connected intermediate their ends upon pins 8 supported by the upper ends of the standards 9, a pair of which are rigidly supported upon each of the platforms 1 and 2.

A cross bar 10 is secured to the platforms adjacent the rear ends thereof and have connected thereto caster wheels 11—11 and an intermediate caster wheel 12 having a spindle 13 carried thereby which is journaled in the cross bar 10 and has fixed to its upper end a cross arm 14 and to the ends of which are connected the rear ends of the crossed guiding rods or cables 15—15, the forward ends of which are connected to the ends of a cross arm 16 fixed to the lower end of the steering post 17. The lower end of the post extends through an opening 18 formed in the platform 2. The upper end of the post is pivotally connected to an eye-bolt 19 which rotatably mounts and retains the head 20 upon the rocking seat 7′. The head 20, likewise the head 21, which is fixed to the seat 7 simulate the heads of horses and are each provided with handle bars 22. Since the head 20 is capable of being rotated rotary movement will be imparted to the post 17 in order that the vehicle can be steered. Obviously rotation of the head 20 and post will operate the guide rods 15—15 to move the caster wheel 12, thereby permitting the child occupying the seat 7′ to guide the vehicle.

A bracket 23 is secured to the platform 2 and has pivotally connected thereto the forward end of a bar 24 and to which is detachably connected the hook 24′ carried by the lower end of the coil spring 25, the upper end thereof being secured to any eye-bolt 26 carried by the seat 7′ in advance of the head 20. The innermost standard 9 upon the platform 2 has thereon a plurality of teeth 27 adapted to be selectively engaged by the rear end of the off-set portion 28 of the bar in order to maintain the spring under proper tension. To release the hook 24′ from the bar it is merely necessary to disengage the bar from the teeth, whereupon the hook can be easily disengaged.

The pitmen 6 are accommodated in the slots 3 and the axle 4 is equipped with ground wheels 29 upon its ends, which in conjunction with the caster wheels 11—11 and caster wheel 12 permits the vehicle to roll when the seats 7 and 7′ are occupied, alternate rocking thereof transmitting rotary motion to the axle through the medium of the pitmen 6.

A child can occupy each seat and by placing the feet upon the foot rest 30 supported by the platforms can with little effort cause the seats to alternately rock to impart rotary movement to the axle 4 as before explained. The spring 25 is primarily for the purpose of pulling the forward end of the seat 7′ downwardly when the vehicle is being propelled by one child and weight is relieved upon the rear end of the seat occupied by the child occasioned by the child rising upwardly and downwardly, thereby preventing a dead center and resultant stalling of the vehicle.

Since the bar 24 is capable of being disengaged from the spring 25 the vehicle can be easily pulled when desired without operating against the resistance of the spring.

In Figure 7 of the drawing, a single platform 31 is employed and in which instance the rear thereof is supported by wheels 32 capable of being guided by crossed rods or cables 33, the rear ends of which connected to the cross arm 34 carried by the bar 35 supporting the wheels 32. The forward ends of said rods are connected to the cross arm 36 fixed to the lower end of the steering post 37, a head 38 similar to the heads of the preferred form being fixed to the upper end of said post.

What is claimed is:—

1. A vehicle of the class described, comprising a pair of platforms, a driving axle connected to the forward ends of the platforms, standards upon the platforms, seats pivotally connected with the standards, driving connections between the seats and axle for imparting rotary movement thereto upon rocking of the seats in alternate directions, a guide wheel carried by the ends of the platforms, a steering post pivotally connected with one of the seats, a head for rotating the post, connections between the post and steering wheel for controlling the latter, and a spring connecting one of the seats and its platform.

2. A vehicle of the class described, comprising a platform, a seat pivotally connected upon the platform, a driving axel connected to the platform, a driving connection between the seat and axle, a bar carried by the platform, a coil spring having one end fixed to the seat and the other end detachably connected to the bar, means for adjusting the bar to regulate the tension of the spring, a guide wheel associated with the platform, a steering post, a head pivotally connected to the post, and connections between the post and guide wheel.

In testimony whereof I affix my signature.

CHARLES H. BOARDMAN.